United States Patent [19]

Haas, Sr. et al.

[11] Patent Number: 4,953,453
[45] Date of Patent: Sep. 4, 1990

[54] APPARATUS FOR OPERATING LOCKS OF BAKING TONGS FOR PRODUCING ROTTABLE, PREFERABLY EDIBLE WAFERS FROM WAFER DOUGH IN A WAFER BAKING OVEN OR AN AUTOMATIC WAFER BAKING MACHINE

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 422,584

[22] Filed: Oct. 17, 1989

[30] Foreign Application Priority Data

Oct. 20, 1988 [AT] Austria ............................ 2597/88

[51] Int. Cl.5 .................................................. A21B 5/02
[52] U.S. Cl. .................................... 99/373; 99/443 C
[58] Field of Search ................ 99/373, 374, 377, 380, 99/381, 382, 383, 384, 386, 426, 427, 443 R, 443 C, 450.6

[56] References Cited

U.S. PATENT DOCUMENTS 1,446,136  2/1923  Stull ........................ 99/373
4,401,015  8/1983  Ziegler ..................... 99/373
4,417,508 11/1983  Haas, Sr. et al. .......... 99/355
4,438,685  3/1984  Haas, Sr. et al. .......... 99/342
4,648,314  3/1987  Plicht et al. .............. 99/373

FOREIGN PATENT DOCUMENTS 211904  3/1924  United Kingdom ............ 99/373
401917 11/1933  United Kingdom ............ 99/373

Primary Examiner—Harvey C. Hornsby
Assistant Examiner—Scott J. Haugland
Attorney, Agent, or Firm—Kurt Kelman

[57] ABSTRACT

An apparatus for operating the locks of wafer baking tongs, which revolve in a wafer baking oven and move past the stationary operating apparatus, which is mounted in the wafer baking oven, comprises a movable closing element, which is engageable with the actuating member of the lock to lock the latter. It is proposed to provide an unlocking element, which is engageable with the actuating member to unlock a lock which has not entirely been locked. An actuator is provided for moving the unlocking element into engagement with the actuating member when the closing element has been pushed back a predetermined distance from its operative position by the actuating member when the lock has not entirely been locked.

12 Claims, 8 Drawing Sheets

APPARATUS FOR OPERATING LOCKS OF BAKING TONGS FOR PRODUCING ROTTABLE, PREFERABLY EDIBLE WAFERS FROM WAFER DOUGH IN A WAFER BAKING OVEN OR AN AUTOMATIC WAFER BAKING MACHINE

BACKGROUND OF THE INVENTION

1. Field of the Invention

This invention relates to an apparatus for operating a lock of baking tongs of a wafer baking oven, which may also be described as an automatic wafer baking oven or a wafer baking machine, as disclosed in e.g. U.S. Pat. Nos. 4,417,508; 4,438,685; and 4,648,314.

2. Description of the Prior Art

Wafer baking ovens or automatic wafer baking ovens serve to produce rottable, preferably edible wafers by a baking of wafer dough between the baking surfaces of a wafer baking mold, which is adapted to be opened and closed and has confronting baking surfaces by which the three-dimensional shape of the baked wafers is determined. Wafer dough is initially introduced into the hot wafer baking mold when it is open and the wafer baking mold is subsequently closed and the wafer dough is baked in the wafer baking mold to form the finished wafer.

In the wafer producing industry, wafer baking ovens and automatic wafer baking ovens are used to produce identical wafers in a large quantity from a wafer dough, which in most cases is liquid. In the wafer baking ovens or automatic wafer baking ovens a multiplicity of identical wafer baking molds are received or integrated in a corresponding number of identical wafer baking tongs, which are consecutively arranged to form a star-shaped array or an endless chain and revolve through a baking space from a dough pouring station to a wafer taking station.

Such wafers may consist, e.g., of large rectangular wafer sheets, flat wafers, low hollow wafers, wafer cups, wafer plates and hollow wafers, such as cast wafer cornets and cast wafer figures. Such wafers are baked in most cases from a liquid baking dough or wafer dough, which contains no sugar or only a small proportion of sugar.

Said wafers or wafer products are fragile, crisp and brittle and have in the final product a moisture content not in excess of 0.5 to 4% and must be distinguished from soft elastic wafers, which have in the final product a moisture content in excess of 8%.

Flat wafers and low hollow wafers, such as rectangular or round wafer sheets, oblates, hollow body halves, which by means of flat webs are connected to form a single large wafer, which may be called a low hollow wafer and may have the shape of a nut, egg, acorn, cube, cylinder and the like, may be produced in wafer baking ovens or automatic wafer baking ovens, in which wafer baking molds are used which are received in baking tongs that are provided with carrying frames or such molds are integrated in baking tongs having no carrying frame. Each of said wafer baking molds consists of two flat, substantially rectangular baking plates, which are provided with lateral closing bars, which protrude from the baking surfaces. Each of said closing bars is secured to or integrated in one of the two baking plates. In most cases mutually opposite closing bars constitute venting bars, which define vent openings or vent passages permitting an escape of the water vapor which is formed in the wafer baking mold as the dough is baked therein and of the surplus dough which has been poured. As the wafer baking mold is closed, the baking surfaces of the two baking plates are caused to approach each other to leave a clearance which equals the wall thickness of the wafers which are to be baked. The wafer baking mold defines a baking cavity, which is closed at its top and bottom by the baking surfaces of the baking plates and which is laterally closed by the closing bars, which protrude from the baking surfaces. As a result, the three-dimensional shape of that baking cavity for the wafer to be baked and the three-dimensional shape of the baked wafer are determined by the two baking surfaces and the closing bars.

In the production of flat wafers and of low hollow wafers in wafer baking ovens, liquid wafer dough is poured into the hot wafer baking mold when it is open, preferably onto the baking surface of the bottom baking plate, the wafer baking mold is closed in that the top baking plate is caused to approach the bottom baking plate so as to leave a clearance which corresponds to the wall thickness of the wafer to be baked, and the dough is then baked in the closed wafer baking mold to produce the final wafer, which is taken from the wafer baking mold when it has been opened. When the wafer baking mold is closed, it is perfectly sealed except for the vent passages in the lateral closing bars and an opening of the wafer baking mold under the action of the vapor pressure which builds up during the baking process and the action of the gases produced during the baking process. This is accomplished in that when the wafer baking mold has been closed the halves of the baking tongs, which contain the baking plates, are rigidly locked by means of the lock of the baking tongs and the closed baking tongs are kept in a locked condition while they are moved through the baking space of the wafer baking oven before the wafers are taken.

In the production of cast hollow wafers, wafer baking molds are employed which can be opened and closed and which consist of a male section provided with cores, which are equal in number to the hollow wafers to be made in the wafer baking mold at the same time and correspond in shape to the desired hollow wafer, a female section, which is in most cases bipartite and formed with mold cavities which are equal in number to the cores and correspond in shape to the desired hollow wafers, and an opening and closing mechanism for moving the sections of the baking mold relative to each other. Those molds for baking hollow wafers are also received by baking tongs, which are provided with carrying frames, and are kept in a closed and/or rigidly locked state by the lock of the baking tongs during the baking process.

It is known to provide wafer baking tongs with various locks which are locked or unlocked as the closed wafer baking tongs move past a stationary operating apparatus which is mounted on the oven frame of the wafer baking oven. That opening and closing of the lock of the baking tongs, i.e., the locking and unlocking of the baking tongs, must clearly be distinguished from the opening and closing of the baking tongs, i.e. from the movement of the sections of the baking tongs away from and toward each other. The opening and closing of the baking tongs effect an opening and closing of the wafer baking mold of the baking tongs at the same time. The opening and closing of the lock of the baking tongs effects only an unlocking and locking of the baking tongs when the wafer baking mold is closed so that a spontaneous opening of the closed wafer baking mold by the pressure of the gases which are formed during the baking process in the dough which is enclosed in the wafer baking mold when the lock is closed (locked) will be prevented.

In known wafer baking tongs the lock comprises a rotatable locking mandrel, which is provided in the lock carrier of one tong member and extends at right angles to the plane of the baking plate and is provided with a hammer head at one end and with a rotary spider at the other end, and a rigid locking plate, which is provided on the lock carrier of the other tong member and is parallel to the planes of the baking plates and cooperates with the hammer head. For locking and unlocking, the locking mandrel is rotated through 90° by means of a stationary stop, which is fixed to the oven frame and engages the rotary spider of the baking tongs which are passing by. The locking mandrel is held in its current angular position by means of a spring-biased ball, which enters corresponding indentations formed on the periphery of the locking mandrel.

In other known wafer baking tongs the lock consists of a cylindrical bore, which is parallel to the planes of the baking plate and is formed in one tong section in a portion thereof which is substantially at right angles to the planes of the baking plate, and a cylindrical pin, which is mounted in the other tong section and is displaceable in a direction which is parallel to the planes of the baking planes. Said pin is aligned with the bore when the baking tongs are closed and is pushed into the bore in order to lock the two tong members together.

In other known baking tongs the lock comprises a locking pin, which protrudes at right angles to the planes of the baking plates from the lock carrier of one tong section and when the baking tongs are closed extends through an opening in the lock carrier of the other tong section, and a hook, which is pivoted to the lock carrier of the other tong section and is engageable with said locking pin and is provided with an actuating member. That lock is opened and closed by means of a stationary operating apparatus, which is mounted on the oven frame and comprises a closing element, which is engageable with the actuating member of the hook in order to impart a pivotal movement to the hook and which is biased to an operative position, which corresponds to the locking position and/or the unlocking position of the hook.

The known locks of baking tongs have the disadvantage that an incomplete locking action may result in a high stress on the lock members which only incompletely interengage and this may result in a premature wear or fracture of a lock member so that long shutdown times of the wafer baking oven and high production losses may result because the members of the lock must prematurely be renewed.

Summary of the Invention

It is an object of the invention to eliminate these disadvantages.

In an apparatus for operating a lock of wafer baking tongs which revolve in a wafer baking oven and move past the stationary operating apparatus which is mounted in the wafer baking oven and comprises a movable closing element, which is biased to an operative position and in said operative position is engageable by the actuating member for the lock, that object is accomplished in that an unlocking element is provided, which is engageable with the actuating member and adapted to cause the actuating member to unlock the lock when it is only incompletely locked, and the coupling element is movable by an actuator into engagement with the actuating member when the closing element has been pushed back a predetermined position from its operative position by the actuating member because the lock has not been completely locked.

The invention prevents a premature wear or breakage of the locks of the baking tongs so that a shortening of the life of such locks is also prevented. This is accomplished in that any lock which has only inadequately be locked is entirely opened before the vapor pressure which builds up in the wafer baking mold can result in an excessive load on the lock members because the roller of the lock is still under the guide rail. Whereas the baking tongs which are concerned will remain unlocked in that case and the vapor which is formed in that wafer baking mold will prematurely escape so that a satisfactory wafer will not be produced in that wafer baking mold, the useful life of the locks will not be reduced and a breakage of the locking members during the operation of the wafer baking oven will be avoided. This is of high importance because long shutdown times would be required in case of repairs as the wafer baking oven must be permitted to cool down and must subsequently be heated up to its operating temperature and said long standstill times will result in high production losses.

Because in accordance with the invention the unlocking operation depends on a displacement of the closing member from its operative position for a predetermined distance, a lock which is not entirely in its optimum locking position will not be unlocked unless the load which is applied to the locking members of the lock of the baking tongs in that position of the locking members would exceed a predetermined value which is still permissible. This would be the case, e.g., if the lock member which is considered is in engagement only to an extent of 60 to 75% of the extent which would be required for an optimum locking position.

In accordance with a further feature of the invention the unlocking member is pivoted to the frame of the wafer baking oven and for engaging the actuating member is movable between a position of rest and an engaging position and said unlocking member is provided with a guide rail for guiding the actuating member as the lock is unlocked. In that design the unlocking member will be pivotally moved to its engaging position only when this is required and will remain in that engaging position only for the duration of the unlocking operation. As a result, a lock which belongs to succeeding baking tongs and has sufficiently been locked cannot be unlocked by mistake in that its actuating member engages the unlocking member.

In accordance with a further feature of the invention a switch is provided, which is actuable when the closing element has been pushed back a predetermined, preferably adjustable distance from its operative position by the actuating member and said switch serves to energize the actuator for moving the unlocking element from its position of rest to its engaging position.

That switch can be used to start a swivel drive for swivelling the locking member into the path of movement of the actuating member of the lock. That switch may optionally be connected with means for shutting down the entire wafer baking oven so that the cause which has resulted in the incomplete locking and renders the unlocking necessary can be eliminated quickly.

A further feature of the invention resides in that the unlocking element and the closing element are incorporated in a camming member, which is movable transversely to the direction of travel of the baking tongs and is coupled to the actuator and serves to guide the actuating member.

The camming member may be designed to constrain the actuating member of the lock to move along such a path that the lock will not entirely be opened (unlocked) until the lock has entirely been closed (locked) when the baking tongs have been closed. If the lock has only incompletely been locked, e.e., because the baking tongs have not been closed to the extent which is required to permit a complete locking, the actuator will displace the entire camming member to such an extent that the actuating member of the lock will be constrained to perform such a displacement that that part of the camming member which constitutes the unlocking element will entirely open the lock.

In accordance with a further feature of the invention a ramp element for engagement by the actuating member is provided and precedes the unlocking element and/or the closing element and moves the lock to its open position. Owing to that design the actuating member of the lock can be moved to the optimum position for the locking action before the baking tongs have entirely been closed.

In accordance with a further feature of the invention a plurality of switches are provided, which are actuable in dependence on the movement of the camming member and serve to control the actuator, a first of said switches is actuated when the closing element is in its operative position while the camming member is in its initial position, a second of said switches is actuated when the closing element has been pushed back a predetermined, preferably adjustable distance from its operative position, and a third of said switches is actuated when the camming member has performed a maximum displacement from its initial position. Owing to that design the parts of the operating apparatus in accordance with the invention can be reciprocated between exactly defined positions by means of the camming member and the operation of the actuator and the parts of the operating apparatus and the movement of the camming member will automatically be adjusted to the speed at which the wafer baking tongs revolve and will automatically be adapted to a change of said speed. An additional safety will be achieved if the first switch which is associated with the operative position of the closing element is connected to means for shutting down the entire wafer baking oven so that the wafer baking oven will be shut down when the camming member does not return to its initial position after an unlocking operation, e.g., because the actuator for operating the camming member does not return to its initial position.

In accordance with a further feature of the invention the actuator which is coupled to the camming member comprises a pneumatic cylinder, which in one end position is pressurized to hold the camming member to the position in which the closing member is in its operative position in order to lock the lock, and said cylinder is movable from that end position to its other end position in order to unlock the lock.

The pneumatic cylinder will effect an unlocking by a force which is not dependent on the forces which can be derived from the movement of the chain of revolving baking tongs and the magnitude of that force can be adapted to the desires and requirements which are to be met in each case whereas the means for driving the chain of baking tongs of the wafer baking oven will not adversely be affected and its power need not be increased.

In accordance with a further embodiment of the invention the actuator which is coupled to the camming member exerts on the actuating member an unlocking force which is a multiple of the biasing force acting on the closing element. The unlocking force is suitably 5 to 20 times, preferably 10 times, the biasing force. Because the unlocking force is much stronger than the biasing force which acts on the closing element in order to permit the lock to be closed, it will be ensured that a lock will reliably be opened entirely when it has been incompletely been locked but has been jammed.

DETAILED DESCRIPTION OF THE PREFERRED EMBODIMENTS

Figure 1:
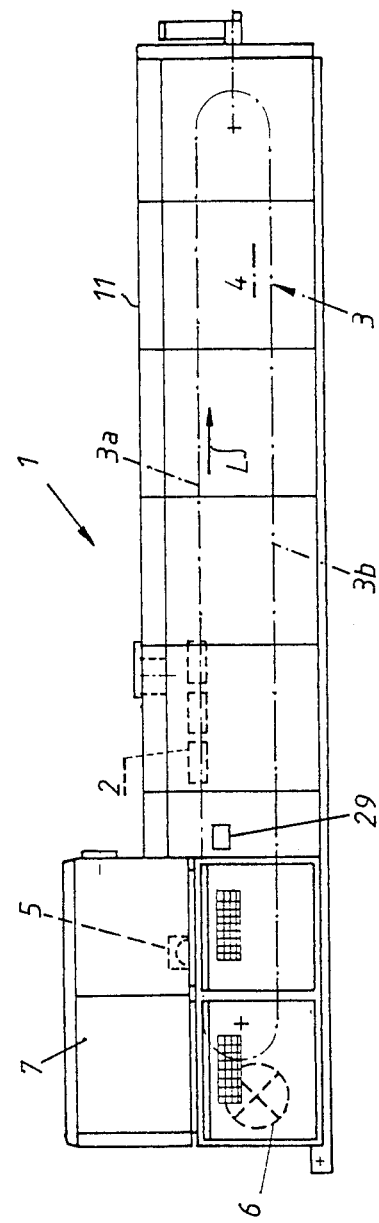
FIG. 1 is a diagrammatic side elevation showing a wafer baking oven provided with revolving baking tongs, which have been connected to form an endless chain of baking tongs.

The invention will now be described more in detail with reference to the drawings, in which illustrative embodiments of the apparatus in accordance with the invention are illustrated, which are provided in a wafer baking oven 1 that comprises revolving baking tongs 2, which are connected to form an endless chain 3 of baking tongs and move through an elongate parallelepipedic heated baking space 4 in which the baking tongs constitute two courses 3a, 3b, which are arranged one over the other and move in mutually opposite directions.

The wafer baking oven 1 is provided at its forward end with a front end head 7, which comprises a dough pouring station 5 and with a wafer taking station 6 and which is adjoined by the baking space 4. The wafer baking tongs 2 are provided with wafer baking molds and revolve in the interior of the wafer baking oven 1 and as said baking tongs 2 move through the front end head 7 they are opened so that the wafer can be taken and the dough can subsequently be charged and when the dough has been introduced into the wafer baking molds the baking tongs 2 are closed and in a closed state are transported through the baking space 4 and then back into the front end head 7.

As the baking tongs 2 move through the wafer baking oven 1 the baking tongs 2 of the upper course 3a and the lower course 3b are supported by means of laterally mounted wheels 8 on track rails 10, which are mounted adjacent to each side wall 9 of the oven and extend in the longitudinal direction of the wafer baking oven 1. By means of angle bars or hollow bars the track rails 10 are secured to the carrying frame of the wafer baking oven 1. That carrying frame carries the side walls 9 of the oven as well as the top wall 11 extending over the baking space.

Figure 2:
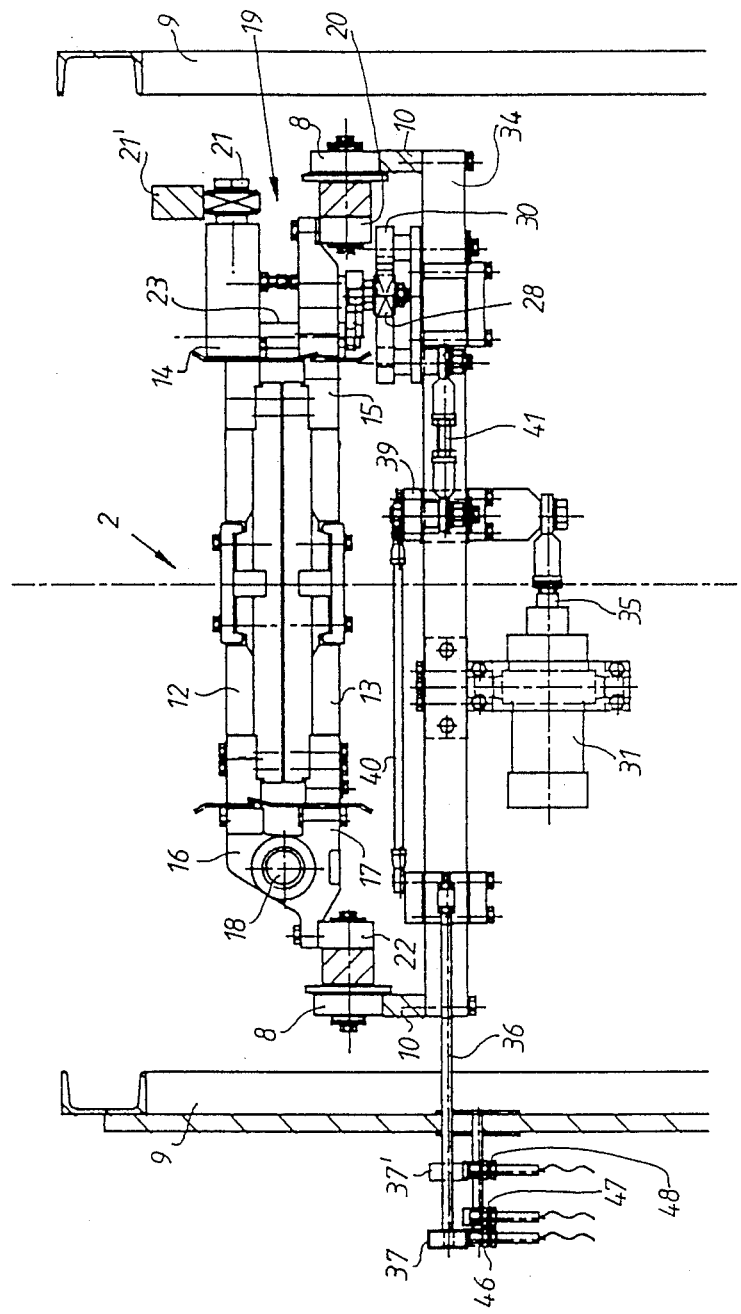
FIG. 2 is a transverse sectional view on a plane which in the wafer baking oven shown in FIG. 1 extends adjacent to the operating apparatus for the baking tong locks.
Figure 4:
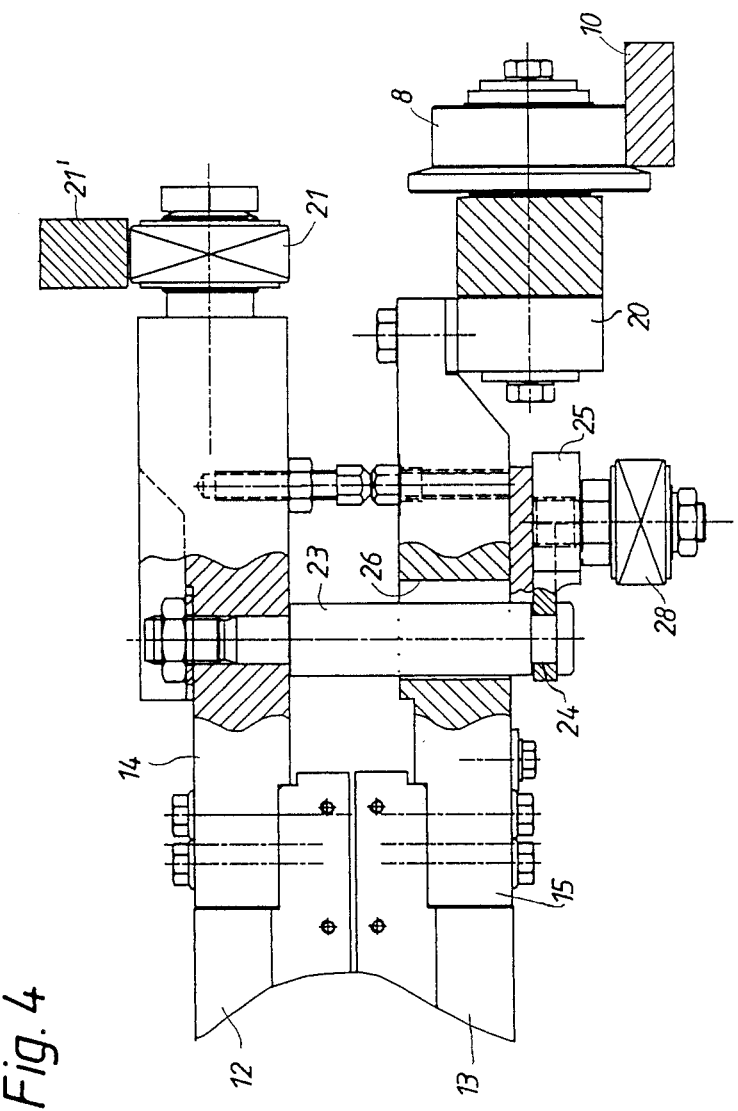
FIG. 4 is a sectional view showing the lock of wafer baking tongs.

FIG. 2 shows an embodiment of wafer baking tongs 2 which comprise integrated, self-supporting and flat baking plates 12 and 13, which on their confronting inside surfaces carry the baking surfaces, not shown, of the wafer baking mold, which can be opened and closed. The baking tongs 2 consist of two tong members, which are connected by a hinge. The top tong member is shown at the top in FIGS. 2 and 4 and comprises a top lock carrier 14, the top baking plate 12 and the top part 16 of the hinge. The bottom tong member is shown at the bottom in FIGS. 2 and 4 and consists of the bottom lock carrier 15, the bottom baking plate 13 and the bottom part 17 of the hinge. Each of the two parts 16 and 17 of the hinge is secured to the associated baking plate 12 or 13 on one side and the parts 16 and 17 together with the pivot 18 constitute the hinge between the two tong members. The two lock carriers 14 and 15 are secured to the two baking plates 12, 13 on that side which is opposite to the hinge and constitute the lock 19 of the baking tongs 2 and serve to pivotally open and close the baking tongs as the wafer baking mold is opened and closed. The bottom lock carrier 15 is fixedly connected to a link plate 20 of an endless chain for transporting the baking tongs 2. The top lock carrier 14 carries a laterally mounted guide roller 21 for interengaging with a track rail 21', which guides the top tong member in FIGS. 2 and 4 toward the bottom tong member as the baking tongs are closed. An endless transport chain which is shown on the left in FIG. 2 is provided, which is parallel to the endless transport chain that is shown on the right in FIG. 2. The transport chain shown on the right comprises a link plate 22, which carries the lateral rollers 8 and to which the bottom hinge part 17 is secured.

Figure 5:
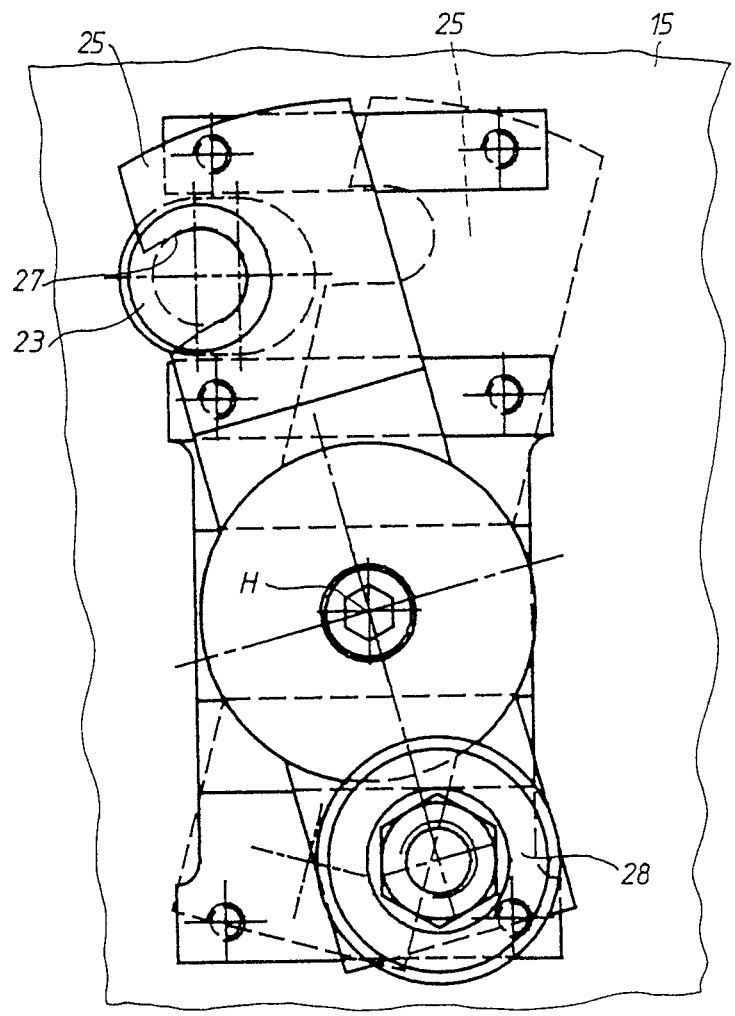
FIG. 5 is a bottom view showing the baking tongs of FIG. 4.

The lock of the baking tongs 2 comprises a cylindrical locking pin 23, which is immovably secured to the top lock carrier 14 and protrudes from the forward face of the top lock carrier 14 substantially at right angles to the planes of the baking plates and in its free end portion has an annular groove 24. The lock also comprises a hook 25, which is pivoted to the rear surface of the bottom lock carrier 15 and is pivotally movable about an axis H, which is at right angles to the planes of the baking plates, between an unlocking position, which is shown in dotted lines in FIG. 5, and a locking position, which is shown in solid lines in FIG. 5. The bottom lock carrier 15 has an opening 26, which extends from the front side to the rear side of the lock carrier 15 and receives the locking pin 23. The hook 25 consists of a flat plate, which has a laterally opening recess 27, which constitutes the mouth of the hook and is interengageable with the annular groove 24 of the locking pin 23. That side face of the annular groove 24 which faces upwardly toward the top lock carrier 14 constitutes a bearing surface for that portion of the rear surface of the hook 25 which surrounds the recess 27. That rear surface faces downwardly in FIGS. 2 and 4. The hook 25 consists of a two-armed lever, which is provided in one arm with the laterally open recess 27 and at its other arm carries the actuating member 28, which is constituted by a roller, which is engageable with guides.

To permit a locking of the baking tong lock 19 when the dough has been poured onto the bottom baking plate 13 and the baking tongs 2 have been closed, an apparatus 29 for operating the lock 19 of the baking tongs is provided adjacent to the front end head 7 of the wafer baking oven 1.

Figure 3:
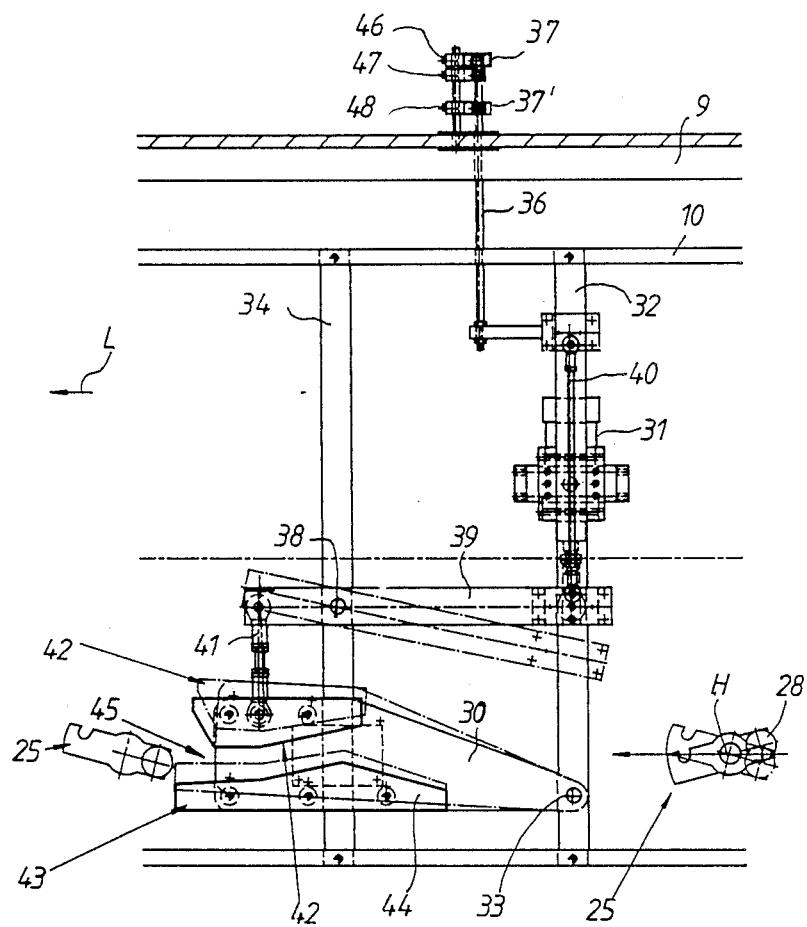
FIG. 3 is a top plan view showing the operating apparatus of FIG. 2.

The operating apparatus 29 shown in FIGS. 2 and 3 comprises a camming member 30, which is disposed adjacent to the path of movement of the hook-actuating roller 28, and a pneumatic cylinder 31, which is connected by a linkage to the camming member. The camming member 30 is pivoted to a first cross-beam 32 on a pivot 33, which is at right angles to the planes of the baking plates and is parallel to the pivotal axis H of the hook. The first cross-beam 32 is disposed below and secured to the track rails 10. The pneumatic cylinder 31 is provided on the underside of the first cross-beam 32 and extends in the longitudinal direction thereof and has a piston rod 35, which is pivoted to the linkage. The linkage comprises a switching rod 36, which is slidably mounted on the first cross-beam 31 and carries a switch actuating member 37. The linkage comprises also a two-armed lever 39, which is pivoted on a pivot 38, which is secured to the second cross-beam 34. The longer lever arm of the lever 39 is pivoted at one end to the piston rod 35 of the cylinder and at the other end to a tie rod 40, which is coupled to the switching rod 36. The shorter lever arm of the lever 39 is pivoted to one end of a link 41, which is preferably adjustable in length and which at its other end is pivoted to the camming member 30.

The camming member 30 comprises a camlike closing element 42, an unlocking element 43, which is disposed opposite to the closing element, and a ramp element 44, which precedes the unlocking element 43. Said elements define between them a track channel 45 for guiding the hook actuating roller 28, which when the camming member 30 is in operative position first approaches the ramp element 44, by which a hook 25 which has not been pivotally moved entirely to its unlocking position is pivotally moved to that unlocking position. Thereafter the hook actuating roller enters the track channel 45, which is defined on one side by the closing element 42 and on the other side by the unlocking element 43.

As baking tongs 2 move in the direction of the arrow L in FIG. 3, the top tong member is initially pivotally moved by the roller 21 and the track rail 21' toward the bottom tong member until the locking pin 23 sufficiently protrudes downwardly from the bottom lock carrier 15. Thereafter the lock 19 of the baking tongs 2 is locked by the operating apparatus 29 in that the actuating roller 28 of the hook 25 moves along the closing element 42 until the recess 27 of the hook 25 interengages with the annular groove 24 of the locking pin 23 and the hook 25 thus assumes its locking position. When the baking tongs 2 continue their movement in the wafer baking oven after the lock 19 has been closed, the roller 21 is released so that the water vapor which is produced as the wafers are baked during the baking process can force the two baking plates 12, 13 and the two tong members apart. As a result, the clearances which exist between the mutually associated bearing surfaces of the hook 25 and the locking pin 23 and of the hook 25 and the bottom lock carrier 15 and which at the operating temperature total about 0.1 to 1.0 mm, preferably 0.2 to 0.6 mm, are eliminated and the bearing surface of the locking pin 23 snugly contacts the rear surface of the hook 25 and the latter snugly contacts the bottom lock carrier 15.

When the actuating roller 28 rolling along the closing element 42 is unable during the locking operation to move the hook 25 to its optimum locking position, the actuating roller 28 will impart to the closing element 42 and to the entire camming member 30 a pivotal movement by which the closing element is pushed back from its operative position so that the linkage 41, 39, 40 which is connected to the camming member 30 will displace the switching rod 36 and the switch actuating member from the position in register with the first switch 46 to the second switch 47. If the displacement is only slight and the closing element 42 is pushed back only slightly from its operative position, because the lock 19 has not inadequately been locked, the switch actuating member 37 will not be moved into registry with the second switch 47. Because the closing element 42 and the camming member 30 are biased to the operative position under the pressure applied to the pneumatic cylinder 31, the closing member 42 and the camming member 30 will return to their operative position, which is the initial position for an operation of the lock 19 of the next baking tongs 2 as soon as the actuating roller 28 has left the track channel 45 of the camming member 30.

The closing element 42 may be pushed back a larger distance from its operative position because the lock 19 is inadequately or incompletely locked. The extent to which the closing element 42 and the camming member 30 are pushed back will then correspond to the distance from the second switch 47 to the first switch 46 so that the switch actuating element 37 is moved into registry with the second switch 47. As a result, the cylinder 31 is operated and by means of the linkage 39, 41 imparts to the camming member 30 a sudden pivotal movement from its operative position (shown in solid lines in FIG. 3) to an open position (shown in phantom in FIG. 3). The unlocking element 43 of the camming member 30 now engages the actuating roller 28 of the hook 25, which is thus swung back to its unlocking position. When the camming member 30 is in its open position, the switch actuating element 37 is moved to its position designated 37' in registry with the third switch 48, which causes the cylinder 31 to be operated, preferably via a time delay circuit, so that the camming member 30 is swung back to its operative position to assume in time the initial position for the operation of the lock 19 of the next baking tongs. In case of a disturbance during the pivotal movement of the camming member to its open position, the switch actuating element 37 does no longer reach its position 37' and the wafer baking oven is shut down.

Figure 6:
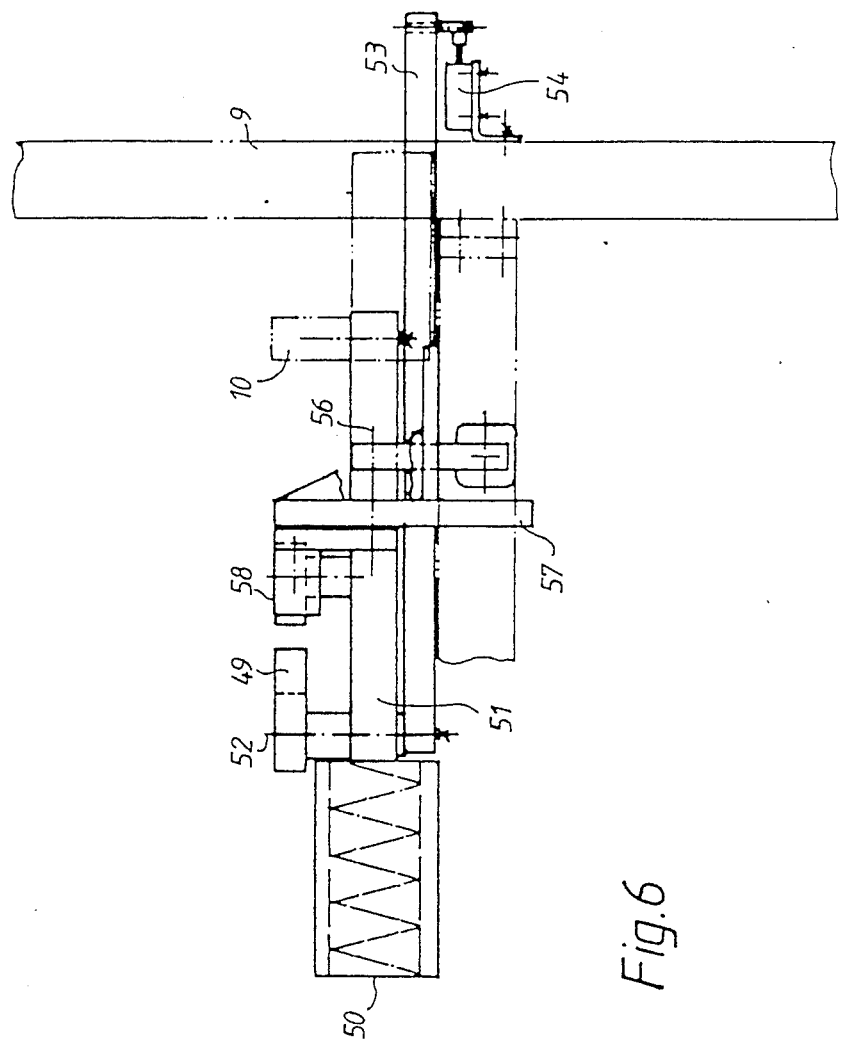
FIG. 6 is an end elevation showing a different embodiment of an operating apparatus.
Figure 8:
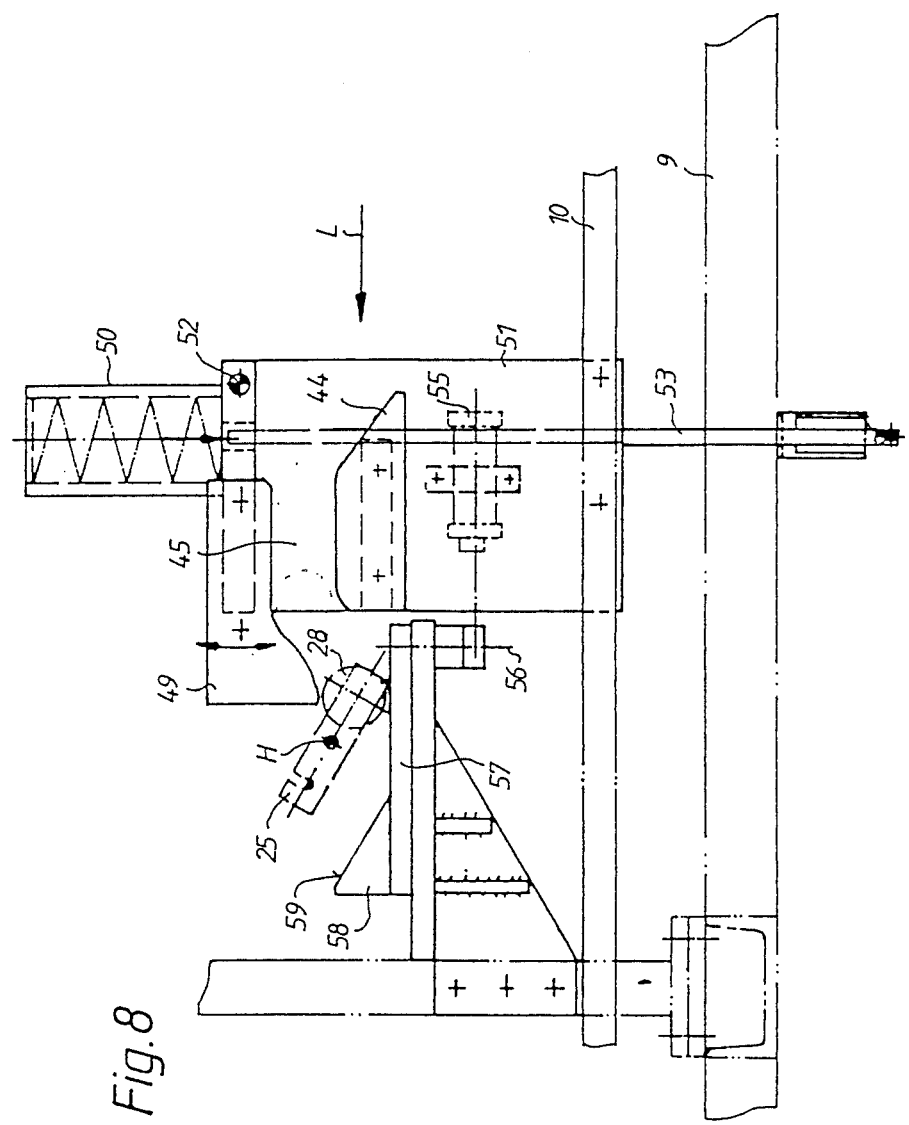
FIG. 8 is a top plan view showing the operating apparatus of FIG. 6.

FIGS. 6 and 8 show another embodiment of the operating apparatus, in which the closing element is biased toward its operative position by a compression spring 50 rather than by a pneumatic cylinder. On a plate 51 which is secured in the underside of the track rail 10 the closing element 49 is pivoted on a pivot 52, which is at right angles to the plane of the baking plate. The closing element 49 is connected to a switching rod 53, which leads to a switch 54, which is secured to the outside of the side wall 9 of the oven. That switch 54 is connected to an actuating cylinder 55 of a swivel drive, which engages a bell crank lever 57, which is pivoted on a pivot 56, which is at right angles to the direction of travel L and parallel to the plane of the baking plate. The unlocking member 58 laterally protrudes from the bell crank lever 57.

Figure 7:
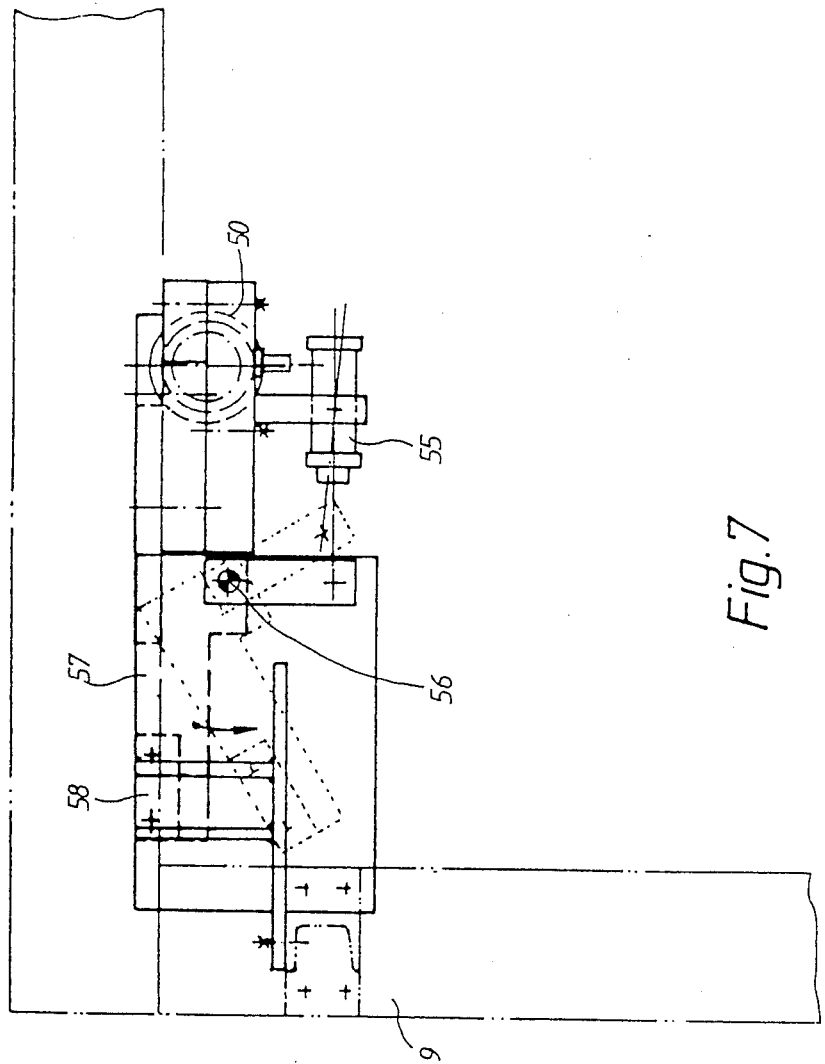
FIG. 7 is a side elevation showing the operating apparatus of FIG. 6.

In that embodiment of the operating apparatus the unlocking element 58 has a surface 59 for guiding the actuating roller 28 of the hook 25 and the bell crank lever 57 and the unlocking element 58 can be pivotally moved from a position of rest, shown in dotted lines in FIG. 7, to the operative position shown in solid lines in FIG. 6 to 8. That pivotal movement will be effected when the closing element 49 has been displaced from its operative position to an extent which can be adjusted at the switch 54 is then actuated. In that case the forces which are exerted by the unlocking element 58 on the hook actuating roller 28 and are required to swing the hook 25 back about its axis H to its unlocking position are derived from the forward movement of the baking tongs in the direction of the arrow L.

It will be understood that in this embodiment it is also possible to provide switches which can be actuated by the cylinder 55 for actuating the swivel drive and are respectively associated with the position of rest and the operative position. In that case the actuation of said switches will shut down the wafer baking oven when the unlocking element is not in its correct position so that damage to the lock will be avoided.

The embodiment shown in FIGS. 6 to 8 suitably comprises also a ramp element 44, which precedes the closing element and which together with the unlocking element 59 defines the track channel 45 for the hook actuating roller 28. That ramp element 44 has the same function and mode of operation as in the embodiment shown in FIGS. 2 to 5.

We claim:
1. In a wafer baking oven comprising
    an oven structure defining an oven space,
    a series of wafer baking tongs, each of which is movable between an open position and a closed position and is provided with a lock, which is movable between an unlocking position, in which said lock permits said tongs to be moved from said closed position to said open position, and a locking position, in which said lock is adapted to lock said tongs in said closed position,
    each of said tongs also comprising a movable actuating member, which is coupled to said lock and is operable in a locking sense to move said lock from said unlocking position to said locking position and in an unlocking sense to move said lock from said locking position to said unlocking position, and is arranged to assume a predetermined final position when said lock is in said locking position of said lock,
    said oven also comprising tong drive means for moving said series of tongs in succession in a predetermined direction of travel along a predetermined endless path extending in said oven space,
    said oven also comprising an operating apparatus, which is mounted on said oven structure at a stationary location adjacent to said path and comprises a closing element, which is movable to and from a predetermined operative position and in said operative position is arranged to engage said actuating member of each of said tongs as said tongs move past said location and to operate said actuating member in said locking sense, and
    biasing means urging said closing element to said operative position, wherein said closing element engaging said actuating member is arranged to be pushed back from said operative position against the action of said biasing means when the movement of said actuating member in said locking sense has been stopped before said lock has reached said locking position as said tongs move past said predetermined location, the improvement residing in that said operating apparatus comprises an unlocking element, which is movable from a position of rest to an engaging position and in said engaging position is arranged to engage said actuating member when said closing member has pushed back at least a predetermined distance from said operative position, and to move said actuating member in said unlocking sense so as to move said lock to said unlocking position, and an actuator, which is operable to move said unlocking element to said engaging position when said closing element has been pushed back by said actuating member at least said predetermined distance from said operative position.

2. The improvement set forth in claim 1, wherein said oven structure comprises a frame, and said unlocking element is mounted in said frame for a pivotal movement between said position of rest and said engaging position and has a guide surface for engaging said actuating member and for guiding said actuating member as it is moved in said unlocking sense when said unlocking member is in said engaging position.

3. The improvement set forth in claim 1, wherein a switch is provided for causing the operation of said actuator to move said unlocking element to said engaging position when said closing element has been pushed back at least said predetermined distance from said operative position.

4. The improvement set forth in claim 1, wherein said switch is adjustable to determine said predetermined distance.

5. The improvement set forth in claim 1, wherein said operating apparatus comprises a camming member, which is mounted in said oven structure for a movement which is transverse to said direction of travel of said baking tongs and is coupled to said actuator and adapted to guide said actuating member as it moves in said locking sense and in said unlocking sense and said unlocking element and said closing element are incorporated in said camming member.

6. The improvement set forth in claim 5, wherein said operating apparatus comprises a ramp element, which is engageable by said actuating member before said actuating member reaches said unlocking element and said closing element as said actuating member moves with said tongs in said direction of travel along said path adjacent to said location and said ramp element is arranged to cooperate with said actuating member to move said actuating member in said unlocking sense.

7. The improvement set forth in claim 5, wherein first, second and third switches are provided for controlling said actuator in dependence of the movement of said camming member transversely to said direction of travel, said camming member is movable transversely to said direction of travel to a predetermined initial position and to a predetermined end position, said camming member is movable by said actuator between said initial and end positions to an intermediate position, in which said closing element is spaced a predetermined distance from said operative position, said first switch is operable to control the operation of said actuator when said closing element has been moved to its operative position while said camming member is in said initial position, said second switch is arranged to control the operation of said actuator when said camming member is in said intermediate position, and said third switch is arranged to control the operation of said actuator when said camming member is in said end position.

8. The improvement set forth in claim 7, wherein said second switch is arranged to control the operation of said actuator when said closing element is spaced a predetermined, adjustable distance from said operative position.

9. The improvement set forth in claim 5, wherein said camming member is movable to a locking position, in which said closing element is in said operative position, said actuator comprises a pneumatic cylinder, which is operable between first and second end positions and in said first end position is arranged to hold said camming member in said locking position, and said unlocking element is operable by said camming member to move said actuating member in said unlocking sense in response to an operation of said cylinder from said first end position to said second end position when said unlocking element engages said actuating member.

10. The improvement set forth in claim 5, wherein said biasing means are arranged to exert a predetermined biasing force on said closing element to urge said closing element to said operative position and said actuator is operable to exert by means of said camming member and said unlocking element on said actuating member a force which is a multiple of said biasing force and tends to move said actuating member in said unlocking sense.

11. The improvement set forth in claim 10, wherein said actuator is operable to exert by means of said camming member and said unlocking element on said actuating member a force which is 5 to 20 times said biasing force and tends to move said actuating member in said unlocking sense.

12. The improvement set forth in claim 10, wherein said actuator is operable to exert by means of said camming member and said unlocking element on said actuating member a force which is ten times said biasing force.

* * * * *